(12) United States Patent
Freitas et al.

(10) Patent No.: US 10,978,917 B2
(45) Date of Patent: Apr. 13, 2021

(54) RF-TO-DC CONVERTER

(71) Applicant: DRAYSON TECHNOLOGIES (EUROPE) LIMITED, London (GB)

(72) Inventors: Vitor Freitas, London (GB); Bruno Franciscatto, London (GB)

(73) Assignee: Drayson Technologies (Europe) Limited, London (GB)

( * ) Notice: Subject to any disclaimer, the term of this patent is extended or adjusted under 35 U.S.C. 154(b) by 0 days.

(21) Appl. No.: 16/476,637

(22) PCT Filed: Jan. 12, 2018

(86) PCT No.: PCT/GB2018/050092
§ 371 (c)(1),
(2) Date: Jul. 9, 2019

(87) PCT Pub. No.: WO2018/130849
PCT Pub. Date: Jul. 19, 2018

(65) Prior Publication Data
US 2019/0326785 A1 Oct. 24, 2019

(30) Foreign Application Priority Data
Jan. 13, 2017 (GB) .................................. 1700662

(51) Int. Cl.
*H02J 50/27* (2016.01)
*H02J 50/40* (2016.01)
(Continued)

(52) U.S. Cl.
CPC ............ *H02J 50/27* (2016.02); *H01P 1/2007* (2013.01); *H01Q 1/248* (2013.01); *H02J 50/001* (2020.01);
(Continued)

(58) Field of Classification Search
CPC .......... H02J 50/001; H02J 50/20; H02J 50/27; H01Q 1/248; H02M 7/06
See application file for complete search history.

(56) References Cited

U.S. PATENT DOCUMENTS 10,063,063 B2 *  8/2018  Chen ...................... H02M 7/06
10,312,743 B2 *  6/2019  Ouda ...................... H02J 50/20
(Continued)

FOREIGN PATENT DOCUMENTS

GB      2538575 A    11/2016
GB      2538576 A    11/2016
(Continued)

OTHER PUBLICATIONS

Stoopman, Mark, et al. "Co-design of a CMOS rectifier and small loop antenna for highly sensitive RF energy harvesters." IEEE Journal of Solid-State Circuits 49.3 (2014): 622-634. (Year: 2014).*
(Continued)

*Primary Examiner* — Ryan Johnson
(74) *Attorney, Agent, or Firm* — Michael Best and Friedrich LLP

(57) ABSTRACT

A converter (200) for converting a received radio frequency signal into a DC signal for powering a load (300). The converter (200) comprises a first rectifying arm (207) for generating a DC signal based on a first RF voltage input obtained from the received RF signal. A second rectifying arm (209) generates a DC signal based on a second RF voltage input obtained from the received RF signal. The received RF signal provides the voltage difference between the first RF voltage input and the second RF voltage input.

17 Claims, 8 Drawing Sheets

(51) Int. Cl.
    H01P 1/20      (2006.01)
    H01Q 1/24      (2006.01)
    H02M 7/06      (2006.01)
    H02J 50/00     (2016.01)
    H02J 50/20     (2016.01)
(52) U.S. Cl.
    CPC .............. H02J 50/20 (2016.02); H02J 50/40 (2016.02); H02M 7/06 (2013.01)

(56) References Cited

U.S. PATENT DOCUMENTS

| | | | |
|---|---|---|---|
| 2012/0163049 A1 | 6/2012 | Jung et al. | |
| 2016/0087479 A1* | 3/2016 | McFarthing | H02J 50/20 307/104 |
| 2019/0288609 A1* | 9/2019 | Tsuru | H02M 7/066 |

FOREIGN PATENT DOCUMENTS

| | | |
|---|---|---|
| JP | H11-69667 A | 3/1999 |
| WO | 2015019106 A2 | 2/2015 |

OTHER PUBLICATIONS

GB Search Report for corresponding Application No. GB1700662.8 dated Mar. 8, 2017.
International Search Report issued for corresponding International Application No. PCT/GB2018/050092 dated Mar. 28, 2018.

* cited by examiner

RF-TO-DC CONVERTER

CROSS REFERENCE TO RELATED APPLICATIONS

This application is a national stage filing under 35 U.S.C. § 371 of International Patent Application No.: PCT/GB2018/050092, filed Jan. 12, 2018, which claims priority to Great Britain Patent Application No. 1700662.8, filed Jan. 13, 2017, the entire contents of all of which are hereby incorporated by reference herein.

FIELD OF THE INVENTION

The present disclosure relates to methods and apparatus for harvesting energy from stray electromagnetic fields which may be emitted from electrical and electronic devices.

BACKGROUND

Wireless power transfer systems are used to transmit power between electrical devices using time varying electromagnetic fields. It is possible to transfer electrical power using alternating electrical field (E-field) and/or alternating magnetic field (H-field). Some wireless power transfer systems operate using so-called near-field coupling. Others may use far-field coupling. Typically, H-field power transfer, also known as inductive power transfer may be more effective in the near-field, whereas in the far-field E-field effects may be more useful.

Wireless battery chargers and near-field RF communications devices both use inductive coupling to transfer power via an alternating H-field. Wireless battery chargers are in widespread use. Such chargers may include coils which can couple inductively with a similar coil carried by a device which is to be charged. In these kinds of systems, the transmitting and receiving coils can be placed in very close proximity to each other.

Near-field RF communications devices such as RFID and NFC devices are perhaps the most common type of wireless power transfer devices. The operating frequency of near field RF communications is around 13.56 MHz. Telecommunications devices such as cellular telephone handsets, Wi-Fi® access points and routers, and telecommunications network nodes such as base stations may provide relatively high energy emissions. These emissions can be used to mediate data signals over relatively long distances, and typically rely on far-field, as opposed to near-field, effects.

Wireless energy harvesting systems are generally designed to profit from RF transmissions by employing highly efficient RF-to-DC conversion to supply low-power devices. The efficiency, η, of an RF-to-DC converter is defined as:

η=Pout/Pin where Pin is the input RF power and Pout is the output DC power.

Owing to the very low level of ambient RF transmissions (where Pin is typically zero dBm or less), it is highly desirable for RF-to-DC converters to operate as efficiently as possible, preferably for different RF power sources and/or DC loads.

SUMMARY OF THE INVENTION

Aspects of the invention are as set out in the independent claims and optional features are set out in the dependent claims. Aspects of the invention may be provided in conjunction with each other and features of one aspect may be applied to other aspects.

DRAWINGS

Embodiments of the disclosure will now be described, by way of example only, with reference to the accompanying drawings, in which.

In the drawings like reference numerals are used to indicate like elements.

Specific Description

Figure 1:
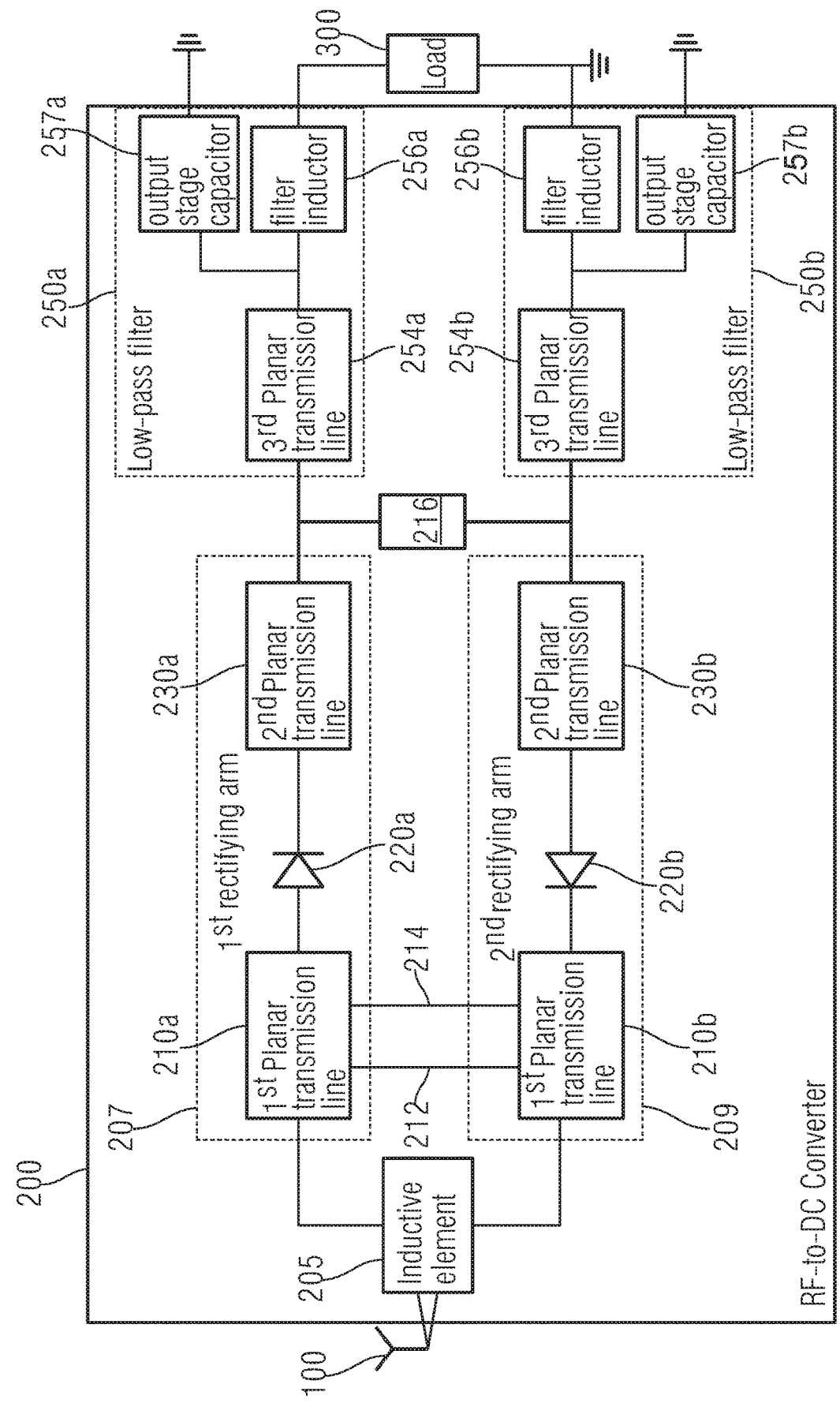
FIG. 1 shows a schematic plan view of an RF energy harvesting apparatus comprising an RF-to-DC converter according to an example.

Aspects of the disclosure relate to a converter for converting a received radio frequency signal into a DC signal for powering a load. The converter comprises a first rectifying arm for generating a DC signal based on a first RF voltage input obtained from the received RF signal, and a second rectifying arm for generating a DC signal based on a second RF voltage input obtained from the received RF signal.

The received RF signal provides the voltage difference between the first RF voltage input and the second RF voltage input, and each rectifying arm comprises a rectifier arranged to generate, based on its RF voltage input, the DC signal and one or more harmonics of its RF voltage input, and to output the DC signal and the one or more harmonics together with a component of its RF voltage input. Each rectifying arm also comprises a first planar transmission line arranged to guide its RF voltage input to the rectifier, and a second planar transmission line arranged to receive from the rectifier the DC signal, the component of its RF voltage input and the one or more harmonics from the rectifier, and to reflect the one or more harmonics back towards the rectifier.

The first planar transmission line is further arranged to reflect back towards the rectifier radio frequency signals from the rectifier that are based on the reflected signals. The first planar transmission line of the first rectifying arm is connected to the first planar transmission line of the second rectifying arm by a connection which comprises an inductor to allow DC current to flow between the first rectifier arm and the second rectifier arm.

Aspects of the disclosure also relate to a converter for converting a received radio frequency signal into a DC signal for powering a load. The converter comprises a first rectifying arm for generating a DC signal based on a first RF voltage input obtained from the received RF signal, and a second rectifying arm for generating a DC signal based on a second RF voltage input obtained from the received RF signal.

The received RF signal provides the voltage difference between the first RF voltage input and the second RF voltage input. Each rectifying arm comprises a rectifier arranged to generate, based on its RF voltage input, the DC signal and one or more harmonics of its RF voltage input, and to output the DC signal and the one or more harmonics together with a component of its RF voltage input. Each rectifying arm also comprises a first planar transmission line arranged to guide its RF voltage input to the rectifier, and a second planar transmission line arranged to receive from the rectifier the DC signal, the component of its RF voltage input and the one or more harmonics from the rectifier, and to reflect the one or more harmonics back towards the rectifier.

The first planar transmission line is further arranged to reflect back towards the rectifier radio frequency signals from the rectifier that are based on the reflected signals. A connection is provided between the first planar transmission line of the first rectifying arm and the first planar transmission line of the second rectifying arm, and the connection comprises a capacitor.

Aspects of the disclosure also relate to a converter for converting a received radio frequency signal into a DC signal for powering a load. The converter comprises a rectifier arranged to generate, based on the radio frequency signal, the DC signal and one or more harmonics of the radio frequency signal, and to output the DC signal and the one or more harmonics together with a component of the radio frequency signal.

The converter also comprises a first planar transmission line arranged to guide the received radio frequency signal to the rectifier, and a second planar transmission line arranged to receive from the rectifier the DC signal, the component of the radio frequency signal and the one or more harmonics from the rectifier, and to reflect the one or more harmonics back towards the rectifier. The first planar transmission line is further arranged to reflect back towards the rectifier radio frequency signals from the rectifier that are based on the reflected signals.

The converter further comprises a low-pass filter for supplying the DC signal to the load, the low-pass filter comprising a filter inductor in series with the load, a third planar transmission line that connects the second transmission line to the filter inductor, and an output stage capacitor having a first plate coupled to the third transmission line and the filter inductor and a second plate coupled to a reference voltage.

Rectifiers (e.g. diodes) that may be used in wireless energy harvesting to rectify received RF signal can be non-linear devices that generate various harmonics of the RF signal (i.e. a first harmonic at $2f0$, a second harmonic at $3f0$, etc. of the RF signal having fundamental frequency $f0$), as well as the DC component that is required to power a load circuit (e.g. a power management module or a battery charging circuit). These harmonics, as well as a component of the fundamental of the received RF signal that propagates through the rectifier, may be prevented from passing from the rectifier to the load by a simple filter circuit that provides a path to ground for these high-frequency signals. The present inventors have recognised that this approach has the draw-back of unnecessarily reducing the efficiency of the RF-to-DC converter, as it effectively discards RF signals whose power could be harnessed.

More particularly, the present inventors have devised an RF-to-DC converter having a reflective structure that can effectively confine most or all of the harmonic components generated by the rectifier to the vicinity of the rectifier, forcing the harmonics and signals based thereon to propagate through the rectifier multiple times, thus contributing to the DC signal output by the rectifier and consequently increasing the efficiency of the RF-to-DC converter. More specifically, in an example described herein below, the reflective structure comprises a converter comprising two rectifying arms, each rectifying arm having a first and a second planar transmission line with a respective rectifier coupled therebetween, each of these transmission lines being configured to reflect harmonics received from the rectifier back towards the rectifier.

The RF-to-DC converter of some examples may use lumped components enabling a significant size reduction. In addition, as will be explained in more detail below, because the planar transmission lines of each rectifying arm may be coupled via a connection, properties of that connection (for example, its location or capacitance) and/or the properties of the planar transmission lines themselves (as well as other properties of the RF-to-DC converter 200) can be tuned to suppress harmonics of the RF signal, as will be described in more detail with reference to FIG. 5.

Figure 6:
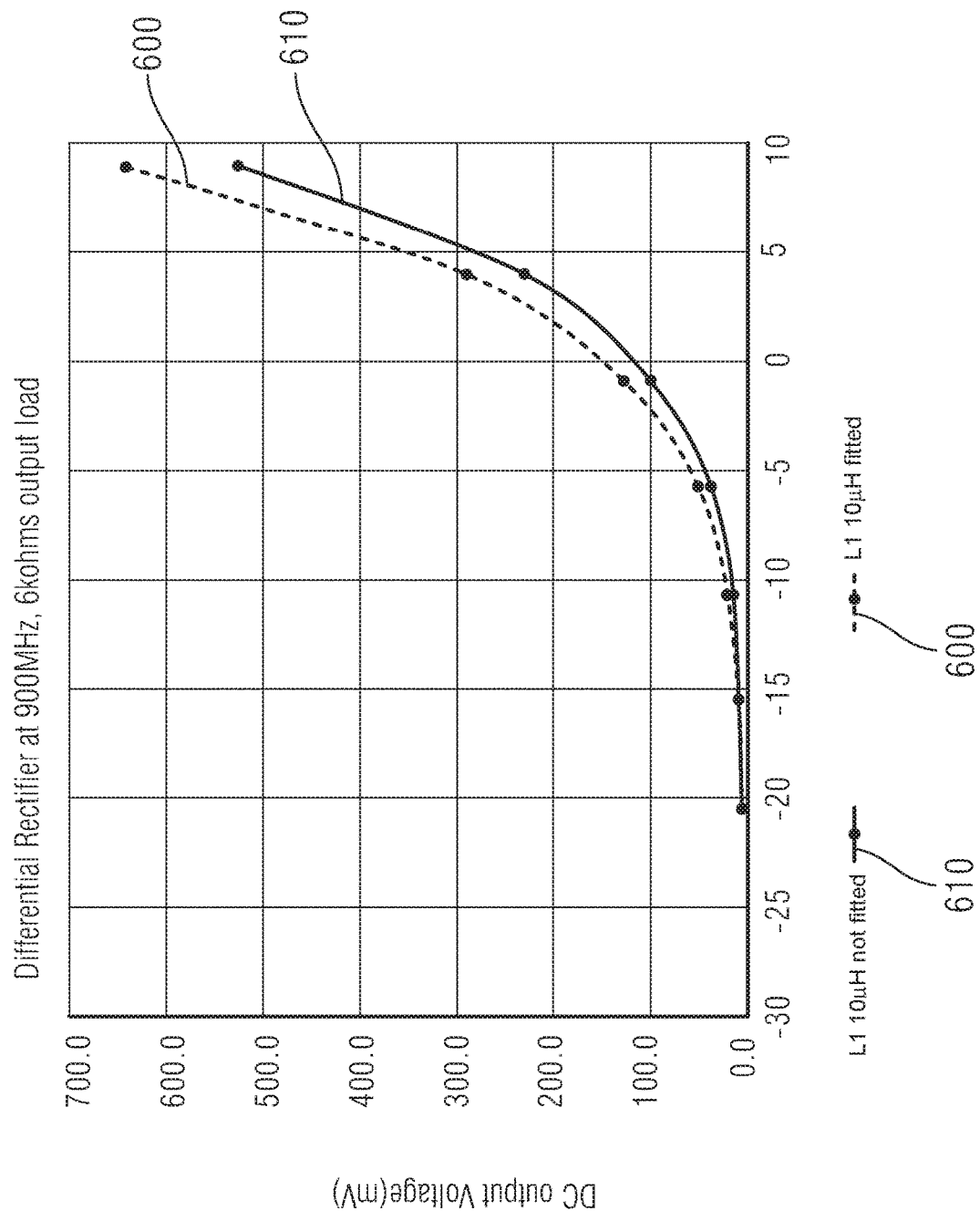
FIG. 6 shows a graph displaying the results of a simulation comparing the conversion of AC to DC of the RF-to-DC converter when the inductive element shown in FIGS. 1, 2 and 3 is present and is not present.

Because the RF-to-DC converter of some examples comprises a first planar transmission line of a first rectifying arm connected to a first planar transmission line of a second rectifying arm by a connection, for example which comprises an inductor, it may allow DC current to flow between the first rectifier arm and the second rectifier arm. For example, the inductor may provide isolation at RF work frequency. It may also provide a short circuit between the differential arms, enabling a DC reference for each rectifier of each rectifying arm. Use of the connection comprising an inductor may also improve RF-to-DC conversion, as will be described in more detail with reference to FIG. 6.

The reflective structure of some examples of the disclosure also has a low-pass filter comprising a filter inductor in series with the load, a third planar transmission line that connects the second transmission line to the filter inductor, and an output stage capacitor having a first plate coupled to the third transmission line and the filter inductor and a second plate coupled to a reference voltage. The low pass filter may be configured to allow the DC component to be extracted from the reflective structure whilst having little or no effect on the reflection of the harmonics within the reflective structure.

As will be explained in the following, this reflective structure can effectively make the RF impedance of the rectifier independent of the input impedance of a load circuit that may be connected to the output of the RF-to-DC converter, allowing the converter to perform efficient RF-to-DC conversion for a variety of different loads or a variable load.

Figure 2:
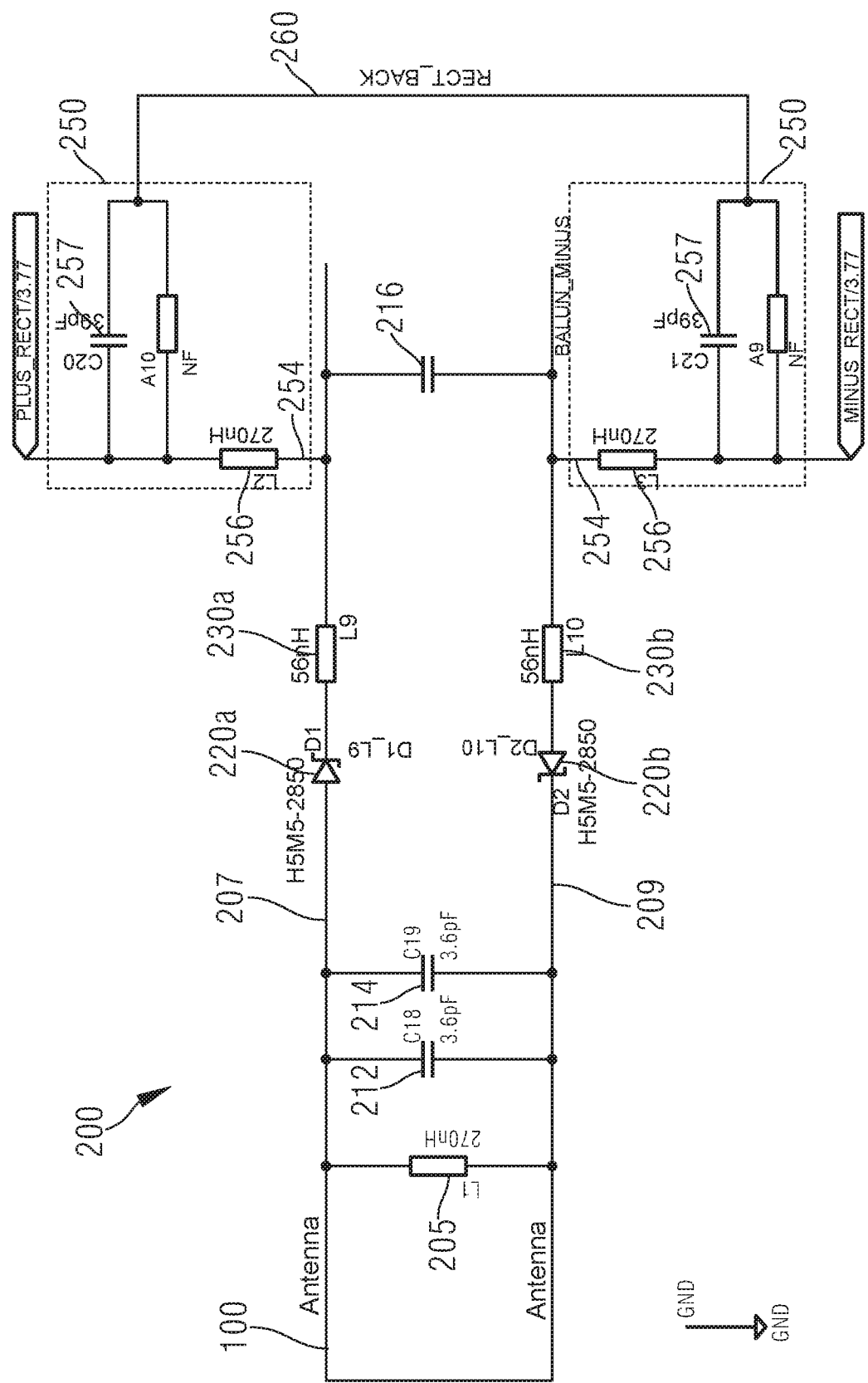
FIG. 2 shows a circuit diagram of an example RF energy harvesting apparatus such as the example apparatus of FIG. 1.
Figure 3:
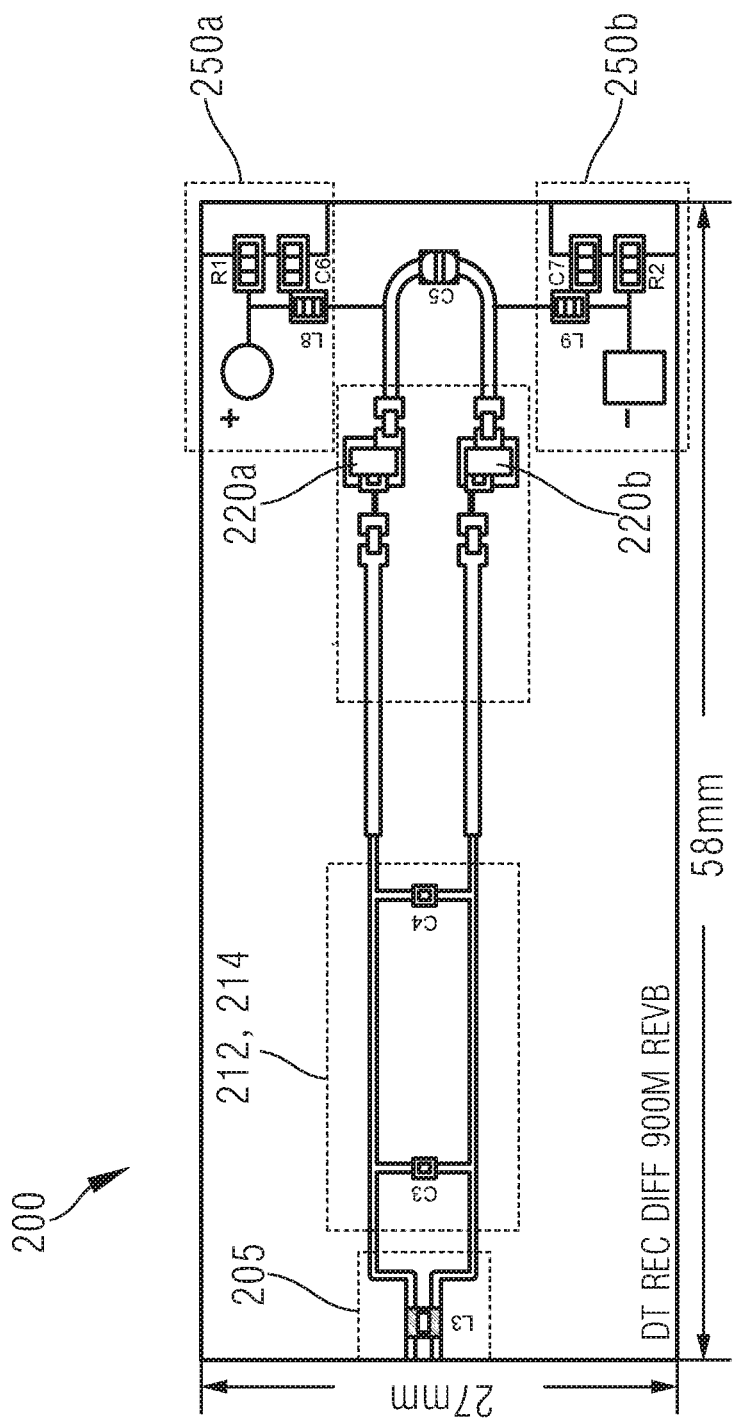
FIG. 3 shows a plan view of an example RF energy harvesting apparatus such as the RF energy harvesting apparatus of FIGS. 1 and 2.

An example RF-to-DC converter is shown schematically in FIG. 1, in a circuit diagram in FIG. 2 and also in plan view in FIG. 3. FIGS. 1 to 3 show an RF-to-DC converter 200 coupled at one end to an antenna 100. The other end of the RF-to-DC converter 200 is coupled to a load 300. The RF-to-DC converter is fabricated from a conductive track printed on a substrate such as a circuit board, for example an FR-4 board. The conductive track forming the RF-to-DC converter may be provided by the same type of conductive track which makes up the antenna 100.

The RF-to-DC converter comprises two rectifying arms 207, 209 arranged in parallel. Each rectifying arm 207, 209 comprises a respective first transmission line 210, a rectifier 220 and a second planar transmission line 230 coupled in series. The rectifier 220 of one arm 207 is oriented in a different direction to the rectifier of the other arm 209. Examples of rectifying elements suitable for use as rectifier 220 include semiconductor devices such as diodes, and in the present example, each rectifier 220 is a Schottky diode. Other examples include the parasitic or inherent diode provided by a transistor, or a gate-source coupled transistor. Each rectifying arm 207, 209 also comprises an input coupling at one end for connecting the first planar transmission line 210a, 210b of each arm 207, 209 to its RF voltage input (in this case the antenna 100) and an output coupling for connecting the second planar transmission line 230a, 230b to a respective low pass filter 250.

The first planar transmission line 210a of the first rectifying arm 207 is connected to the first planar transmission line 210b of the second rectifying arm 209 by a connection which comprises an inductive element 205, such as a lumped component, for example an inductor, connected between the input couplings of the two rectifier arms 207, 209 to allow DC current to flow between the first rectifier arm 207 and the second rectifier arm 209. In the present example, the inductive element 205 comprises an inductor having an inductance of 270 nH. It will of course be understood that in other examples an inductive element 205 is not necessary, and the connection could be replaced by a transmission line such as a stripline or any other conductive link or frequency selective component.

A low-pass filter 250 comprising a filter inductor 256 and a third planar transmission line 254 connects the second transmission line 230 of each rectifying arm 207, 209 to a load 300 via the filter inductor 256. A respective low-pass filter 250a, 250b is coupled to each rectifying arm 207, 209. In the present example, the filter inductor 256 of each low-pass filter 250a, 250b is the same as the inductive element 205 and is a 270 nH inductor, although an inductor having an inductance greater than or less than 270 nH may alternatively be used, for example a 100 nH inductor may be used. The low-pass filter 250 also comprises a lumped component, in this example comprising an output stage capacitor 257 having a first plate coupled to the third transmission line 254 and the filter inductor 256 and a second plate coupled to a reference voltage, which in the present example comprises a virtual ground.

The first 210, second 230 and third 254 planar transmission lines may take one of many different forms known to those skilled in the art. For example, each of the first, second and third planar transmission lines may be a stripline, microstrip, slotline, coplanar waveguide and a coplanar stripline transmission line, or a combination of two or more of these kinds of transmission line. However, in the present example, each of the first, second and third planar transmission lines takes the form of a microstrip transmission line comprising a respective conductive track that is formed on a first side of an insulating substrate, wherein a conductive layer providing a ground plane common to all three transmission lines is formed on an opposite side of the substrate.

The conductive track forming part of the microstrip of each of the first, second and third transmission lines 210, 230, 254 may, as in the present example, be provided in the form of a 35 μm thick copper layer formed on a substrate. Naturally, a metal or another conductive material other than copper may be used instead, and the thickness of the conductive trace may be varied, for example in the range between 9 μm and 70 μm.

In the present example, the tracks which make up the rectifier arms 207, 209 are arranged on the substrate so that the conductive material of each arm is the mirror image of the material of the other arm as reflected in a centre line which bisects the two arms 207, 209.

A connection 212, 214 is provided between the first planar transmission line 210a of the first rectifying arm 207 and the first planar transmission line 210b of the second rectifying arm 207b. In the present example, there are two connections 212, 214 between the first planar transmission line 210a of the first rectifying arm 207a and the first planar transmission line 210b of the second rectifying arm 209. Each connection 212, 215 may comprise a lumped component, for example a capacitor, and may have the same capacitance or a differing capacitance as each other. In the example shown, each connection 212, 214 comprises a respective capacitor with the same capacitance of 3.6 pF. It will of course be understood that in other examples the lumped component need not comprise a capacitor. For example, the two rectifying arms 207, 209 need not be connected by a connection and may instead each comprise a waveguide or length of transmission line such as a stub.

At least one of the properties of the transmission lines 210a, 210b, 230a, 230b, the capacitances of the two first planar transmission lines 210a, 210b and the connections 212, 214 between them are selected to reflect back towards the rectifier 220 the radio frequency signals from the rectifier 220 that are based on the reflected signals, and may be selected based on the frequencies of the one or more harmonics of the RF voltage input. For example, as will be described in more detail below with reference to FIG. 5, at least one property, for example the dimensions, of the conductive traces forming the microstrips of the first and/or second transmission lines 210a, 210b, 230a, 230b, the length of the first and/or second transmission lines 210a, 210b, 230a, 230b, the distance between the first and/or second transmission lines 210a, 210b, 230a, 230b, the thickness of the substrate, and the location and capacitance of each connection 212, 214 are selected to reflect back towards the rectifier 220 the radio frequency signals from the rectifier 220 that are based on the reflected signals.

In the present example, the dimensions of the conductive traces forming the microstrips of the first transmission lines 210a, 210b, the thickness of the substrate and the capacitance of each connection 212, 214 are selected based on the frequencies of the one or more harmonics of the RF voltage input, which for example, may be a 900 MHz GSM band. In the present example, as can be seen in FIG. 3, there is a step change in the thickness of the first transmission lines 210a, 210b between the two connections 212, 214 and the rectifiers 220a, 220b. The position of the connections 212, 214 are also selected to reflect back towards the rectifier the radio frequency signals from the rectifier that are based on the reflected signals. In some examples, the capacitances of each capacitor 212, 214 may also differ.

The first planar transmission line 210a, 210b of each arm 207, 209 is arranged to receive the RF signals from the antenna 100 and to guide the received RF signals to the rectifier 220. The rectifier 220 of each arm 207, 209 is arranged to generate, based on respective first and second RF voltages of these RF signals, a DC signal and one or more harmonics of the RF signals, and to output the generated signals, together with a fundamental component of the RF signals, to the second planar transmission line 230a, 230b.

In examples where the rectifier 220 receives a first RF signal in a first RF band and a second RF signal in a second RF band via the antenna 100 and the first planar transmission line 210, for example, the rectifier 220 is arranged to generate, based on the first and second RF signals, the DC signal and two or more harmonics of each of the first and second RF signals during operation of the RF-to-DC converter. In this case, the first planar transmission line 210 may be arranged to receive a component of each of the harmonics generated by the rectifier 220 during operation of the RF-to-DC converter.

In the example shown, both the first transmission line 210 and the second transmission line 230 of each rectifying arm 207, 209 are arranged to receive and reflect harmonics of the received RF signals coming from the rectifier 220 back towards the rectifier 220, although it will be understood that in other examples the second transmission line 230 need not be arranged to receive and reflect harmonics of the received RF signals coming from the rectifier 220 back towards the rectifier 220. In the example shown, due to the configuration and arrangement of the first transmission line 210, the connections 212, 214, the rectifier 220 and the second transmission line 230, components of the received RF signals which are not converted to DC on the first pass through the rectifier 220 are subsequently subjected to DC conversion after being reflected to the input of the rectifier 220, and the RF-to-DC conversion efficiency of the converter 200 is consequently increased in relation to a conventional RF-to-DC converter not having the reflective structure of the present example.

The low-pass filter 250 is arranged to transmit the DC signal and to substantially block any RF signals which reach this stage of the converter 200, including a component of the received RF signals and the harmonics of the received RF signals.

In use, the first planar transmission line 210a, 210b of each arm 207, 209 receives RF signals from the antenna 100 and guides the received RF signals to each respective rectifier 220. The rectifier 220a, 220b of each arm 207, 209 generates, based on a respective first and second RF voltage of the RF signals, a DC signal and one or more harmonics of the RF signals, and outputs the generated signals, together with a fundamental component of the RF signals, to each respective second planar transmission line 230a, 230b. DC current flows between the two rectifying arms 207, 209 via inductive element 205, providing a DC reference for each rectifier 220a, 220b.

The DC signal, the fundamental component of the RF signal, and one or more harmonics of the RF signal all pass to the corresponding second planar transmission line 230a, 230b, which is arranged to receive these signals from each corresponding rectifier 220a, 220b and to reflect the harmonic(s) back towards each corresponding rectifier 220a, 220b. As noted above, the connections 212, 214 are also arranged to reflect the harmonics back towards each corresponding rectifier 220a, 220b. The harmonics are reflected back towards each corresponding rectifier 220a, 220b so that some of their power can be converted by each rectifier 220a, 220b to DC, improving the efficiency of the RF-to-DC converter 200. As noted above, the harmonics are reflected back towards each corresponding rectifier 220a, 220b so that some of their power can be converted by each rectifier 220a, 220b to DC, improving the efficiency of the RF-to-DC converter 200.

As will be explained in more detail below with reference to FIG. 5, by using lumped components for the connections 212, 214, the harmonic suppression may be controlled for example by selection of those lumped components and optionally by tuning variables of the transmissions lines and/or connections. For example, the harmonic suppression may be controlled by tuning the capacitor values and/or location of the connections 212, 214, and/or by controlling the dimensions of the transmission lines 210, 230.

The differential DC signal produced by each two rectifying arms 207, 209 then passes to a respective low-pass filter 250. The differential DC signal passes from each second transmission line 230a, 230b of each rectifier arm 207, 209 to a respective filter inductor 256a, 256b via each respective third transmission line 254 and then on to a common load 300. The output stage capacitor 257 which has a first plate coupled to the third transmission line and the filter inductor 256, and a second plate coupled to a reference voltage. The low-pass filter 250 may be configured to allow the differential DC signal component to be extracted from the reflective structure whilst having little or no effect on the reflection of the harmonics within the reflective structure.

As shown in FIGS. 7 and 8, providing the output stage capacitor 257 as part of the low-pass filter 250 in this way may address issues of self-resonance of the low-pass filter 250 and/or may improve RF isolation. For example, the low-pass filter 250 may reduce interference between the rectifiers 220 and the load 300. For example, the inductance of the filter inductor 256, and the capacitance of the output stage capacitor 257 may be selected to adjust the self-resonant frequency of the low-pass filter 250.

Figure 7B:
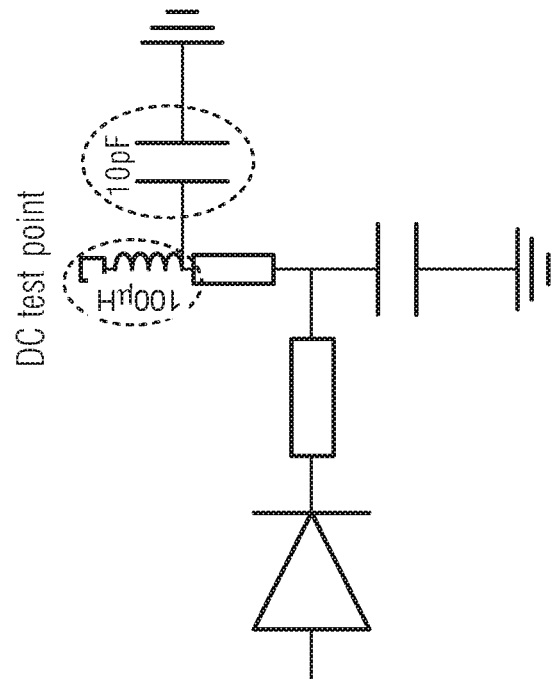
FIG. 7 shows a schematic diagram of a low-pass filter according to examples of the disclosure.
Figure 7A:
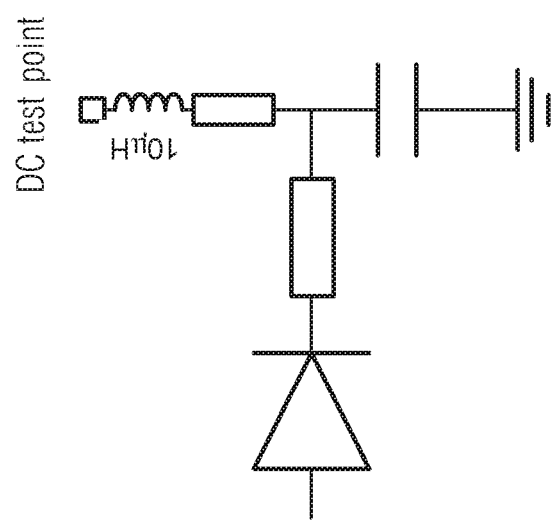

FIG. 7a shows an example low-pass filter that does not comprise the output stage capacitor 257 as described above, and FIG. 7b shows an example that does comprise an output stage capacitor 257 (for example as used in the low-pass filter 250 described above in relation to FIGS. 1 to 3). FIG. 8 shows the results of simulations conducted comparing the two apparatus illustrated in FIGS. 7a and 7b. The lines indicated by the numbers 800 and 850 show the simulated output of an RF-to-DC converter using the apparatus of FIG. 7b with the output stage capacitor, and the lines indicated by the numbers 810 and 860 show the simulated output of an RF-to-DC converter using the low-pass filter of FIG. 7a, without the output stage capacitor.

Figure 8B:
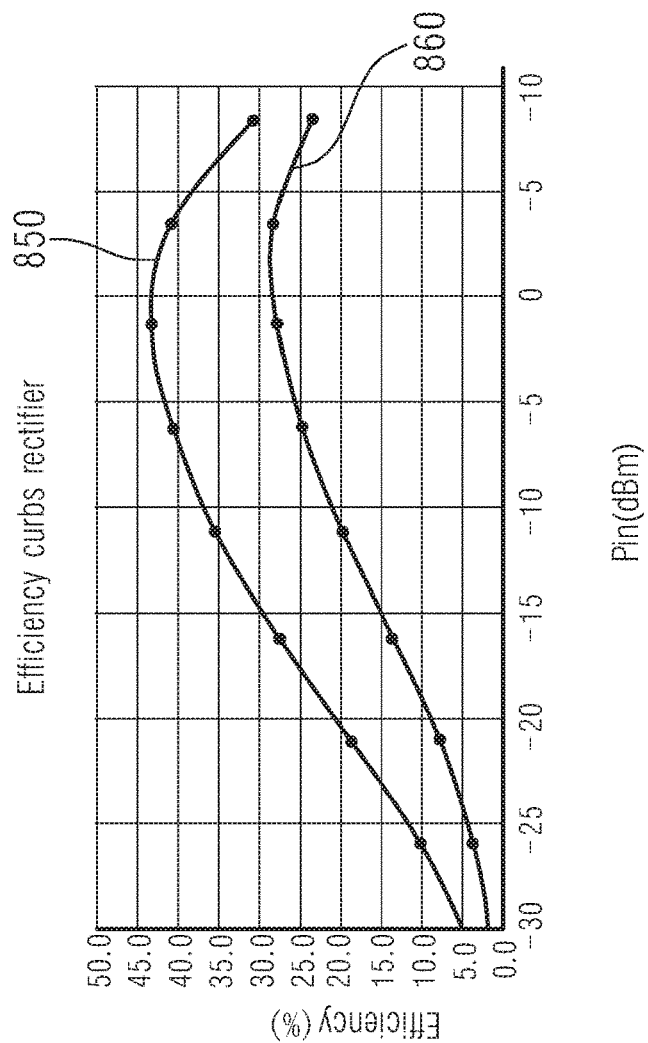
FIG. 8 shows two graphs displaying the improvement in conversion of AC to DC of the RF-to-DC converter when using the low-pass filter of examples of the disclosure.
Figure 8A:
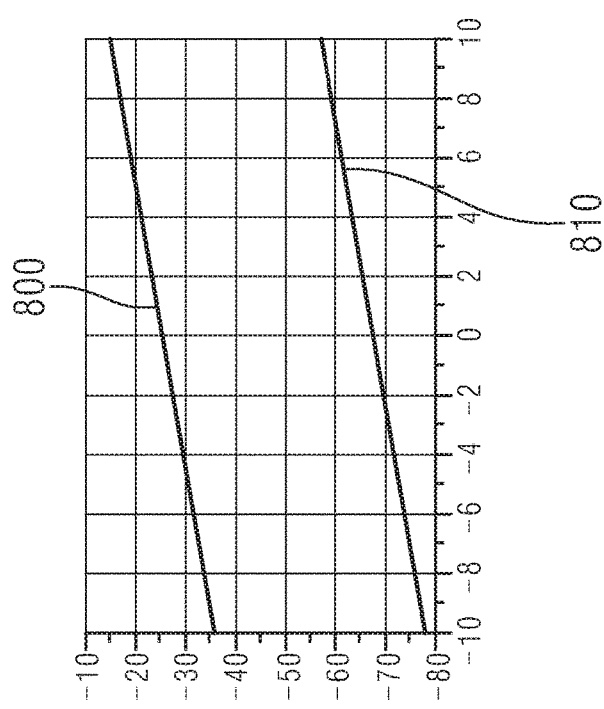

It can be seen that the use of the output stage capacitor (in this example a 10 pF capacitor) as illustrated in FIG. 7b helps to increase RF isolation as shown by the graph of FIG. 8a, as the low capacitance represents a low RF impedance to the ground. It can be seen that the RF level is 40 dB lower using the low-pass filter of FIG. 7b. This enhancement produces an immediate positive impact: less interference between rectifier 220 and load 300. The use of the low-pass filter of FIG. 7b may also improve efficiency as illustrated in FIG. 8b, which shows the rectifier efficiency curb with the apparatus of FIG. 7a (represented by line 860) compared to that of the apparatus of FIG. 7b (represented by the line 850).

The second transmission line 230a, 230b of each rectifying arm 207, 209, or of a single rectifying arm 207, 209, shown in FIGS. 1, 2 and 3 comprises an inductor 230a, 230b, for example having an inductance of 56 nH. It will be appreciated that components shown in FIGS. 1, 2 and 3 may be removed, replaced or combined. For example, it will be appreciated that this inductor 230a, 230b may be removed or replaced. For example, the inductance of the second transmission line 230 may be adjusted or tuned by controlling dimensions and properties of the second transmission line 230, such as its thickness and/or width, and/or spacing relative to another transmission line, such as the second transmission line 230 of another rectifying arm 207, 209, as described above and as will be described in more detail with reference to FIG. 5.

In some examples, the two rectifying arms 207, 209 may also be coupled by a connection, such as a capacitor 216, 316 as shown in FIGS. 1, 2 and 3. The capacitor 216, 316 may reduce AC ripple from the DC output of the rectifiers 220a, 220b by providing a low impedance link for high frequency voltage between the two rectifying arms 207, 209. However it will be understood that this capacitor 216, 316 may be replaced by some other form of conductive link.

Figure 4:
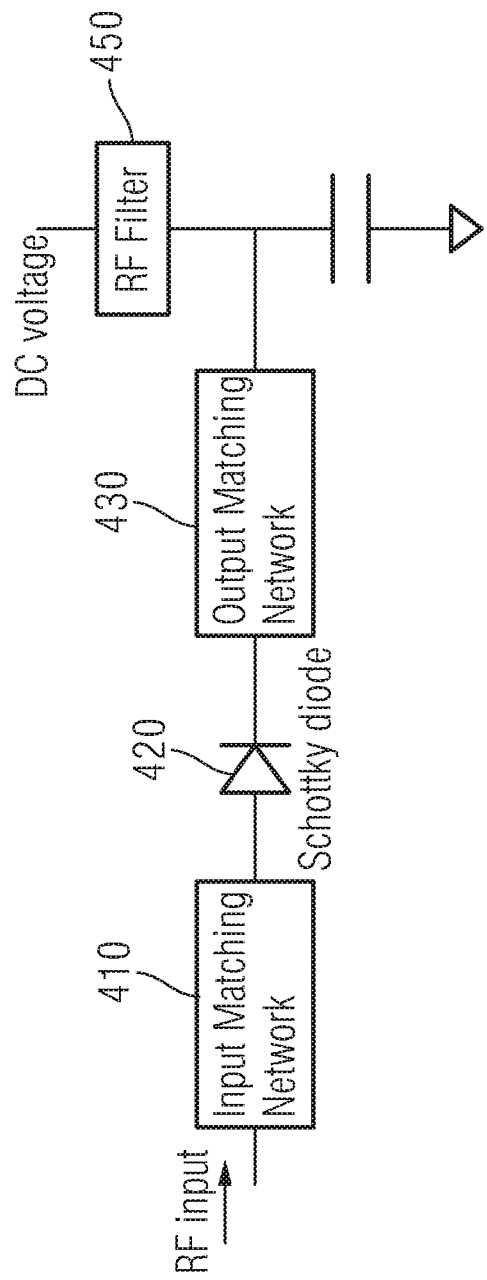
FIG. 4 shows a schematic plan view of another example RF energy harvesting apparatus comprising an RF-to-DC converter comprising a single rectifying arm and a low-pass filter.

Although FIGS. 1, 2 and 3 show each rectifying arm 207, 209 as comprising a respective low-pass filter 250, it will be appreciated that the low-pass filter 250 described above may be used in examples where the RF-to-DC converter only comprises one rectifying arm, for example as shown in FIG. 4. FIG. 4 shows an RF-to-DC converter comprising an input matching network 410 (for example comprising the first transmission line 210 described above in relation to FIGS. 1 to 3), coupled in series to a rectifying component 420 such as a diode, for example a Schottky diode as described above, in turn coupled in series to an output matching network 430 (for example comprising the second transmission line 230 described above in relation to FIGS. 1 to 3). The output matching network 430 is in turn coupled to a low-pass filter 450 (for example the low-pass filter 250 described above in relation to FIGS. 1 to 3).

Figure 5B:
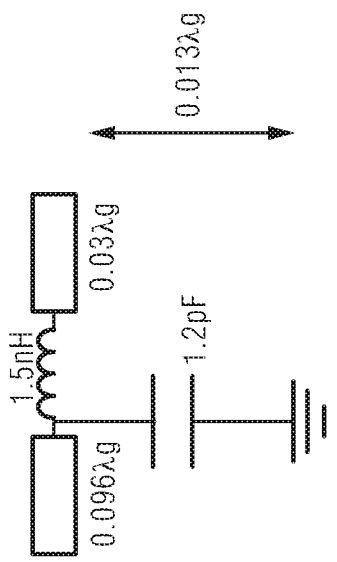
FIG. 5 shows schematic diagrams of how the properties of an example RF-to-DC converter can be adjusted using lumped components.
Figure 5D:
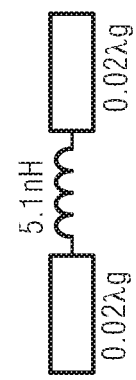
Figure 5A:
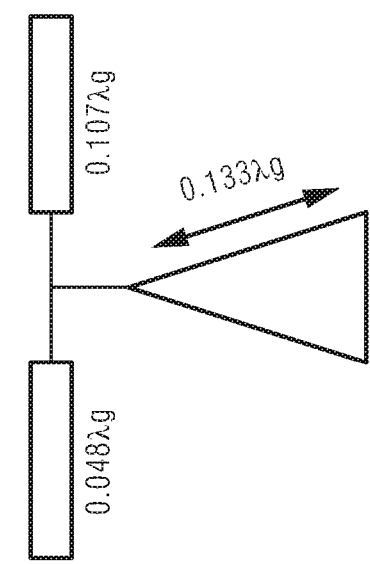
Figure 5C:
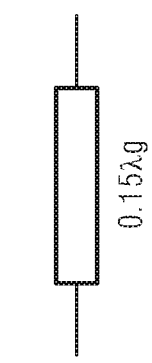

As noted above, the use of lumped components (such as inductors, capacitors) instead of distributed elements (such as stubs, lines) may reduce the footprint of the RF-to-DC converter 200. FIG. 5 helps to illustrate how the impedance of the RF-to-DC converter may be tuned (for example to match the impedance of the antenna) through the use of lumped components (for example off-the-shelf components) and if necessary further tuned by adjusting properties of the transmissions lines 210, 230. For example, FIG. 5a shows a portion of an RF-to-DC converter comprising a stub. FIG. 5b shows an example of the transmission line of FIG. 5a with elements replaced by lumped components—in this case a connection to a reference voltage via a 1.2 pF capacitor and the inclusion of a 1.5 nH inductor. The waveguiding properties of the transmission line can then be altered (for example by adjusting the dimensions of the transmission lines) to reach the selected impedance to match that of the antenna, for example the antenna 100 illustrated in FIG. 1. Similarly, FIG. 5d illustrates how the properties of the transmission line of FIG. 5c can be adjusted or tuned by including a lumped component (in this case a 5.1 nH inductor) and then by further adjusting the properties of the transmission lines themselves.

It will also be understood that in some examples, not all features of the RF-to-DC converter 200 may be present. For example, in some examples, the RF-to-DC converter 200 may not comprise an inductive element 205 and/or may not comprise an output stage capacitor 257.

In the examples shown, the RF-to-DC converter 200 is configured to efficiently rectify RF signals in the UHF frequency band (300 MHz to 3 GHz, for example the 900 MHz GSM band), although it may also be configured to operate in one or more of the VHF band (30 MHz to 300 MHz), the UHF frequency band and the SHF frequency band (3 GHz to 30 GHz), based on design considerations such as the dimensions of the transmission lines 210, 230, 254 and/or the connections 212, 214, for example.

The RF-to-DC converter 200 described above may be a single-band converter arranged to efficiently rectify an RF signal in only a single RF band (e.g. a GSM band or a WiFi band). In these cases, the first planar transmission line 210 may be provided with one or more connections comprising a capacitor 212, 214 between the first planar transmission line 210 of each rectifying arm 207, 209 whose dimensions and properties are set such that the transmission line 210 reflects back towards the rectifier 220 RF signals that are based on the RF signals which have been reflected towards the rectifier 220 by the second planar transmission line 230 of each rectifying arm 207, 209, i.e. RF signals comprising the harmonics and any other spectral components close to the harmonic frequencies that may have been generated by the rectifier 220 based on the RF signals incident thereon.

In other examples, the RF-to-DC converter 200 may be configured as a dual-band converter, to efficiently convert a first RF signal in a first frequency band and a second RF signal in a second frequency band that is separate from the first frequency band into the DC signal. In other words, the RF-to-DC converter 200 may be configured to convert RF signals in two different frequency bands spanning respective non-overlapping frequency ranges (i.e. ranges having no common value) to generate the DC signal. As an example, the RF-to-DC converter 200 may be optimised to convert a first RF signal of frequency 2.45 GHz in the WiFi band (2.4 GHz to 2.495 GHz) and a second RF signal of frequency 1.840 GHz in the GSM band (1.805 GHz to 1.880 GHz) into a DC signal for powering the load 300. Signals in these frequency bands are of particular interest as they are widely used for wireless communications and are present at appreciable power levels in many populated areas. As such, they tend to provide a reliable source of RF energy. The RF-to-DC converter 200 may be optimised to convert both the aforementioned RF signals with high efficiency when received at a power level of approximately −20 dBm, which is expected to occur in many practical applications, although it is also capable of converting such RF signals with power levels at or below zero dBm. As noted above, the RF-to-DC converter 200 may alternatively be configured as a single-band converter, and tuned to perform RF-to-DC conversion of RF signals in a single RF frequency band.

The antenna 100 may be any antenna suitable for receiving the first and second RF signals, and is preferably impedance-matched to the input impedance of the RF-to-DC converter 200, in order to maximise power transferred to the converter. In examples of the present disclosure, the antenna 100 may be a dual-band antenna arranged to receive RF signals in one or two frequency bands (for example, the 2.4 GHz WiFi® band (spanning 2.4 GHz to 2.495 GHz) and/or the 1.8 GHz GSM band, which is between 1.805 GHz and 1.880 GHz). At both of these frequencies, the impedance of the antenna is around 100Ω. The antenna 100 is preferably as described in UK patent application GB 15 135 65.0, the contents of which are incorporated herein by reference in their entirety.

The antenna 100 and the rectifiers 220a, 220b may be designed so that their impedances match that of the reflective structure formed by the two rectifying arms 207, 209 and/or each of the first planar transmission lines 210a, 210b. However, in cases where the impedances of the antenna 100 and the rectifiers 220a, 220b are dictated by design constraints required to optimise the performance of these components, the RF-to-DC converter may further be provided with an impedance-matching structure which ensures that substantially the same impedance ("substantially the same" meaning the same to within a tolerance such as 20%, 15%, 10%, 5% or 2%) is presented to the fundamental frequency component of each of the first and second RF signals, where this impedance is substantially the same as that of the rectifiers 220a, 220b and preferably also substantially the same as that of the antenna 100.

The rectifiers 220a, 220b may be any non-linear electrical component capable of rectifying the RF signals it receives via the first planar transmission line 210 to generate a DC signal. As a consequence of the rectifier's non-linearity, the signal output by the diode will contain RF signal components (including the fundamental frequency f0 and harmonics 2f0, 3f0 and 4f0 etc.), as well as the rectified DC signal. For example, the rectifier 220 may be a diode. The rectifier may, as in the present example, be provided in the form of a Schottky diode, for example an Agilent HSMS-2850 zero-bias Schottky diode. Zero-bias diodes have a relatively low barrier (high saturation current), resulting in a higher efficiency for low power input levels when compared to externally-biased detector diodes.

In some embodiments the thickness of the substrate is selected to provide a particular guided wavelength $\lambda_g$. The substrate may comprise an electrical insulator such as a dielectric laminate material, which may comprise a thermoset plastic. Such a substrate may have a loss tangent of between 0.02 and 0.05 at the frequency bands of the antenna. These frequency bands may comprise the 2.4 GHz WiFi band (spanning 2.4 GHz to 2.495 GHz) and the 900 MHz GSM band. The substrate may have a loss tangent of between 0.003 and 0.004 at these frequencies, for example 0.0035. The substrate may have a relative permittivity of between 2.17 to 10.2, for example between 3 and 6, for example about 5, for example 4.8. The substrate may be rigid. For example it may have a Young's modulus of at least 1 GPa, for example at least 5 GPa, for example at least 10 GPa, for example less than 40 GPa, for example less than 25 GPa. The substrate may have a young's modulus of between 10 GPa and 30 GPa, for example between 20 GPa and 25 GPa. One example of such a material is FR-4 glass epoxy. In the present case the substrate is 0.5 mm thick.

It will, of course, be appreciated that this example of a material is given by way of example only, and that other substrate materials (e.g. RO4003® produced by Rogers Corp™, which has a relative permittivity of 3.55 and a loss tangent of 0.0027 at these frequencies, or a RO3000® series high-frequency laminate) may be used.

The substrate may be at least 50 μm thick, for example at least 100 μm thick, for example between 100 μm and 3 mm, for example between 0.125 mm and 1.52 mm. In an example the substrate is rigid and is 0.75 mm thick.

In some examples the substrate may be flexible, for example it may have a young's modulus of less than 1 GPa. In some embodiments the substrate may be resilient, for example it may be configured so that the antenna tends to recover its shape after deformation.

The substrate may be flat, or may be shaped according to the shape of the energy source from which it is intended to harvest power. For example, the substrate can be shaped so as to form a part of the housing of an electronic device. For example, it may be shaped to provide a clip-on case for a device such as a cellular telephone or tablet computer.

In addition to mounting on telephone handsets, power harvesting apparatus of the present disclosure may be provided in, or as accessories to any of a wide variety of sources of RF energy. Some may be provided in heat resistant cases or in mechanically robust and/or water resistant cases to enable them to be integrated into machinery such as internal combustion engines.

The substrate may be more rigid than the conductive track e.g. to provide mechanical support to the loops, but in some embodiments it may be flexible and/or resilient.

The RF-to-DC converter 200 and/or the antenna 100, or any component thereof, may be manufactured by subtractive or additive processes. It may also be manufactured by assembling pre-manufactured components together such as by adhering a conductive sheetlike element to the substrate. This may be done by laying down a preformed track of the conductive material, or by laying down a larger sheet and then etching it away. This sheetlike element may be grown or deposited as a layer on the substrate. If it is deposited a mask may be used so the deposition happens only on regions which are to carry the conductive track and/or it may be allowed to take place over a larger area and then selectively etched away.

Other methods of manufacture may also be used. For example, the antenna may be manufactured by way of '3D printing' whereby a three-dimensional model of the antenna is supplied, in machine readable form, to a '3D printer' adapted to manufacture the antenna. This may be by additive means such as extrusion deposition, Electron Beam Freeform Fabrication (EBF), granular materials binding, lamination, photopolymerization, or stereolithography or a combination thereof. The machine readable model comprises a spatial map of the object to be printed, typically in the form of a Cartesian coordinate system defining the object's surfaces. This spatial map may comprise a computer file which may be provided in any one of a number of file conventions. One example of a file convention is a STL (STereoLithography) file which may be in the form of ASCII (American Standard Code for Information Interchange) or binary and specifies areas by way of triangulated surfaces with defined normals and vertices. An alternative file format is AMF (Additive Manufacturing File) which provides the facility to specify the material and texture of each surface as well as allowing for curved triangulated surfaces. The mapping of the antenna may then be converted into instructions to be executed by 3D printer according to the printing method being used. This may comprise splitting the model into slices (for example, each slice corresponding to an x-y plane, with successive layers building the z dimension) and encoding each slice into a series of instructions. The instructions sent to the 3D printer may comprise Numerical Control (NC) or Computer NC (CNC) instructions, preferably in the form of G-code (also called RS-274), which comprises a series of instructions regarding how the 3D printer should act. The instructions vary depending on the type of 3D printer being used, but in the example of a moving printhead the instructions include: how the printhead should move, when/where to deposit material, the type of material to be deposited, and the flow rate of the deposited material. In some embodiments the power harvesting antenna may be encapsulated in a flexible case, for example a polycarbonate case.

The tracks of the RF-to-DC converter 200 may be deposited or printed and other components, such as the rectifier 220a, 220b mentioned above, may also be provided by the same process.

The RF-to-DC converter 200 as described herein may be embodied in one such machine readable model, for example a machine readable map or instructions, for example to enable a physical representation of said antenna to be produced by 3D printing. This may be in the form of a software code mapping of the antenna and/or instructions to be supplied to a 3D printer (for example numerical code).

In the context of the present disclosure other examples and variations of the apparatus and methods described herein will be apparent to a person of skill in the art.

Described herein is a converter for converting a received differential radio frequency, RF, signal into a DC signal for powering a load, wherein the received differential RF signal provides a voltage difference between a first RF voltage input and a second RF voltage input. The converter comprises a first rectifying arm for generating a DC signal based on a signal obtained from the first RF voltage input, and a second rectifying arm for generating a DC signal based on a signal obtained from the second RF voltage input, wherein each rectifying arm comprises:
- a rectifier arranged to generate, based on its RF voltage input, the DC signal and one or more harmonics of its RF voltage input, and to output the DC signal and the one or more harmonics together with a component of its RF voltage input;
- a first planar transmission line arranged to guide its RF voltage input to the rectifier; and
- a second planar transmission line arranged to receive from the rectifier the DC signal, the component of its RF voltage input and the one or more harmonics from the rectifier, and to reflect the one or more harmonics back towards the rectifier;
- wherein the first planar transmission line is further arranged to reflect back towards the rectifier radio frequency signals from the rectifier that are based on the reflected signals; and
- wherein the first planar transmission line of the first rectifying arm is connected to the first planar transmission line of the second rectifying arm by a connection which comprises an inductor to allow DC current to flow between the first rectifier arm and the second rectifier arm.

The first rectifier arm and the second rectifier arm may each comprise an input coupling for connecting the first planar transmission line of each arm to its RF voltage input, and the inductor is connected between the input couplings of the two rectifier arms.

The inductor may comprise a lumped component.

Also described herein is a converter for converting a received differential radio frequency, RF, signal into a DC signal for powering a load, wherein the received differential RF signal provides a voltage difference between a first RF voltage input and a second RF voltage input, the converter comprising:
- a first rectifying arm for generating a DC signal based on a signal obtained from the first RF voltage input, and
- a second rectifying arm for generating a DC signal based on a signal obtained from the second RF voltage input, wherein each rectifying arm comprises:
  - a rectifier arranged to generate, based on its RF voltage input, the DC signal and one or more harmonics of its RF voltage input, and to output the DC signal and the one or more harmonics together with a component of its RF voltage input;
  - a first planar transmission line arranged to guide its RF voltage input to the rectifier; and
  - a second planar transmission line arranged to receive from the rectifier the DC signal, the component of its RF voltage input and the one or more harmonics from the rectifier, and to reflect the one or more harmonics back towards the rectifier;
  - wherein the first planar transmission line is further arranged to reflect back towards the rectifier radio frequency signals from the rectifier that are based on the reflected signals; and
  - wherein a connection is provided between the first planar transmission line of the first rectifying arm and the first planar transmission line of the second rectifying arm, and the connection comprises a capacitor.

At least one of the capacitance of the capacitor, the capacitance of the first planar transmission line, the inductance of the first planar transmission line, and the dimensions of the first planar transmission line may be selected to reflect back towards the rectifier the radio frequency signals from the rectifier that are based on the reflected signals.

The position of the connection may be selected to reflect back towards the rectifier the radio frequency signals from the rectifier that are based on the reflected signals.

The capacitor may comprise a lumped component.

The converter may comprise two of said connections, wherein each of said connections comprises a respective capacitor.

The capacitances may be different from each other.

The capacitances may be selected based on the frequencies of the one or more harmonics.

The first planar transmission line of the first rectifying arm may be connected to the first planar transmission line of the second rectifying arm by a further connection which comprises an inductor to allow DC current to flow between the first rectifier arm and the second rectifier arm.

The first rectifier arm and the second rectifier arm may each comprise an input coupling for connecting the first planar transmission line of each arm to its RF voltage input, and the inductor is connected between the input couplings of the two rectifier arms.

The inductor may comprise a lumped component.

The converter may comprise a low-pass filter for supplying the DC signal to the load, the low-pass filter comprising a filter inductor in series with the load, a third planar transmission line that connects the second transmission line to the filter inductor, and an output stage capacitor having a first plate coupled to the third transmission line and the filter inductor and a second plate coupled to a reference voltage.

The output stage capacitor may comprise a lumped component.

The reference voltage may be ground.

The low pass filter may be arranged to transmit the DC signal and to substantially block the component of the radio frequency signal and the harmonics of the radio frequency signal.

The invention claimed is:

1. A converter for converting a received radio frequency signal into a DC signal for powering a load, the converter comprising:
   - a first rectifying arm for generating a DC signal based on a first RF voltage input obtained from the received RF signal, and
   - a second rectifying arm for generating a DC signal based on a second RF voltage input obtained from the received RF signal,
   wherein the received RF signal provides the voltage difference between the first RF voltage input and the second RF voltage input, and each rectifying arm comprises:
   - a rectifier arranged to generate, based on its RF voltage input, the DC signal and one or more harmonics of its RF voltage input, and to output the DC signal and the one or more harmonics together with a component of its RF voltage input;
   - a first planar transmission line arranged to guide its RF voltage input to the rectifier; and
   - a second planar transmission line arranged to receive from the rectifier the DC signal, the component of its RF voltage input and the one or more harmonics from the rectifier, and to reflect the one or more harmonics back towards the rectifier;

wherein the first planar transmission line is further arranged to reflect back towards the rectifier radio frequency signals from the rectifier that are based on the reflected signals; and wherein the first planar transmission line of the first rectifying arm is connected to the first planar transmission line of the second rectifying arm by a connection which comprises an inductor to allow DC current to flow between the first rectifier arm and the second rectifier arm.

2. The converter of claim 1 wherein the first rectifier arm and the second rectifier arm each comprise an input coupling for connecting the first planar transmission line of each arm to its RF voltage input, and the inductor is connected between the input couplings of the two rectifier arms.

3. The converter of claim 2 wherein the inductor comprises a lumped component.

4. A converter for converting a received radio frequency signal into a DC signal for powering a load, the converter comprising:
- a first rectifying arm for generating a DC signal based on a first RF voltage input obtained from the received RF signal, and
- a second rectifying arm for generating a DC signal based on a second RF voltage input obtained from the received RF signal,
- wherein the received RF signal provides the voltage difference between the first RF voltage input and the second RF voltage input, and each rectifying arm comprises:
- a rectifier arranged to generate, based on its RF voltage input, the DC signal and one or more harmonics of its RF voltage input, and to output the DC signal and the one or more harmonics together with a component of its RF voltage input;
- a first planar transmission line arranged to guide its RF voltage input to the rectifier; and
- a second planar transmission line arranged to receive from the rectifier the DC signal, the component of its RF voltage input and the one or more harmonics from the rectifier, and to reflect the one or more harmonics back towards the rectifier;
- wherein the first planar transmission line is further arranged to reflect back towards the rectifier radio frequency signals from the rectifier that are based on the reflected signals; and
- wherein a connection is provided between the first planar transmission line of the first rectifying arm and the first planar transmission line of the second rectifying arm, and the connection comprises a capacitor.

5. The converter of claim 4 wherein at least one of the capacitance of the capacitor, the capacitance of the first planar transmission line, the inductance of the first planar transmission line, and the dimensions of the first planar transmission line are selected to reflect back towards the rectifier the radio frequency signals from the rectifier that are based on the reflected signals.

6. The converter of claim 4 wherein the position of the connection is selected to reflect back towards the rectifier the radio frequency signals from the rectifier that are based on the reflected signals.

7. The converter of claim 5 wherein the capacitor comprises a lumped component.

8. The converter of claim 4 comprising two of said connections, wherein each of said connections comprises a respective capacitor.

9. The converter of claim 8 wherein the capacitances are different from each other.

10. The converter of claim 9 wherein the capacitances are selected based on the frequencies of the one or more harmonics.

11. The converter of claim 4 wherein the first planar transmission line of the first rectifying arm is connected to the first planar transmission line of the second rectifying arm by a further connection which comprises an inductor to allow DC current to flow between the first rectifier arm and the second rectifier arm.

12. The converter of claim 11 wherein the first rectifier arm and the second rectifier arm each comprise an input coupling for connecting the first planar transmission line of each arm to its RF voltage input, and the inductor is connected between the input couplings of the two rectifier arms.

13. The converter of claim 12 wherein the inductor comprises a lumped component.

14. The converter of claim 1 further comprising a low-pass filter for supplying the DC signal to the load, the low-pass filter comprising a filter inductor in series with the load, a third planar transmission line that connects the second transmission line to the filter inductor, and an output stage capacitor having a first plate coupled to the third transmission line and the filter inductor and a second plate coupled to a reference voltage.

15. The converter of claim 14 wherein the output stage capacitor comprises a lumped component.

16. The converter of claim 14 wherein the low pass filter is arranged to transmit the DC signal and to substantially block the component of the radio frequency signal and the harmonics of the radio frequency signal.

17. The converter of claim 4 further comprising a low-pass filter for supplying the DC signal to the load, the low-pass filter comprising a filter inductor in series with the load, a third planar transmission line that connects the second transmission line to the filter inductor, and an output stage capacitor having a first plate coupled to the third transmission line and the filter inductor and a second plate coupled to a reference voltage.

* * * * *